United States Patent [19]

Dobler

[11] Patent Number: 5,453,914
[45] Date of Patent: Sep. 26, 1995

[54] ARRANGEMENT WITH AT LEAST TWO STRUCTURAL PARTS ADJUSTABLY CONNECTABLE BY AN ADJUSTING SCREW

[75] Inventor: Karl-Otto Dobler, Reutlingen, Germany

[73] Assignee: Robert Bosch GmbH, Stuttgart, Germany

[21] Appl. No.: 87,169

[22] Filed: Jul. 2, 1993

[30] Foreign Application Priority Data

Aug. 29, 1992 [DE] Germany .................. 42 28 891.6

[51] Int. Cl.⁶ .................................................. B60Q 1/04
[52] U.S. Cl. ........................ 362/66; 362/284; 362/289; 362/428
[58] Field of Search .................. 362/66, 277, 284, 362/285, 287, 289, 418, 428, 427, 396, 457; 74/424.8; 411/437, 432, 433, 104

[56] References Cited

U.S. PATENT DOCUMENTS

| 1,593,784 | 7/1926 | Weems | 362/285 |
| 3,609,014 | 9/1971 | Kurz, Jr. | 411/437 |
| 4,747,023 | 5/1988 | Ball et al. | 362/66 |

FOREIGN PATENT DOCUMENTS

| 68637 | 2/1941 | Czechoslovakia | 362/418 |
| 570285 | 1/1924 | France | 362/285 |
| 353311 | 3/1987 | Germany . | |
| 4-065004 | 3/1992 | Japan | 362/457 |

Primary Examiner—Ira S. Lazarus
Assistant Examiner—Y. Quach
Attorney, Agent, or Firm—Michael J. Striker

[57] ABSTRACT

An adjustable composite device has at least two parts, an adjusting screw adjusting the parts relative to one another and also screw being axially fixed with one of the structural parts so as to be rotatable relative to the latter and threadingly connectable with another of the structural parts, an open threaded shell which is formed on the another structural part, and a U-shaped elastic holding element releasably mounted on the another structural part and having one leg engaging a portion of the another structural part and another leg engaging the adjusting screw so as to hold the adjusting screw with a part of its periphery under tensioning in abutment in the threaded shell.

13 Claims, 3 Drawing Sheets

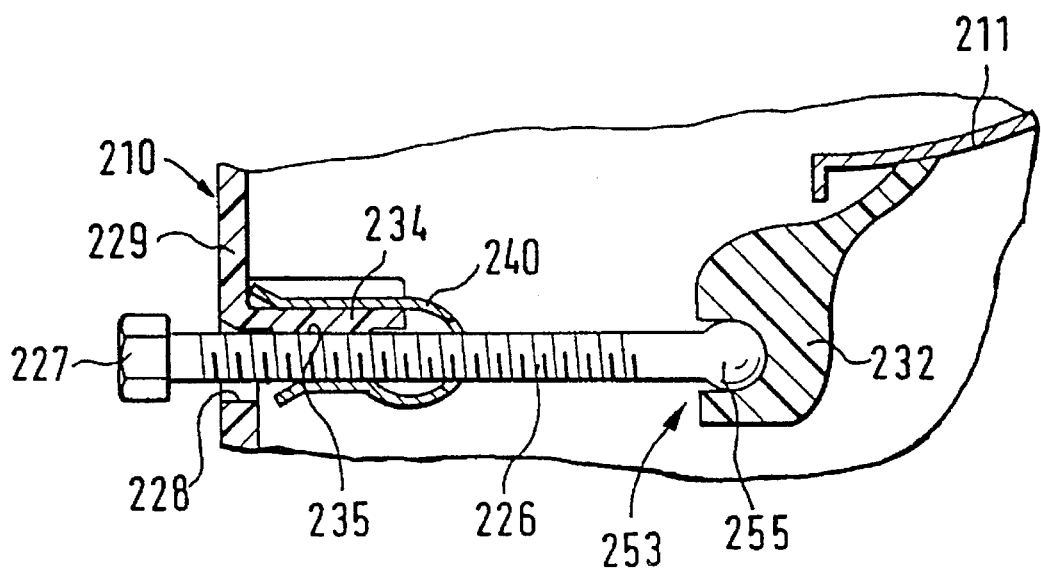
Fig. 6
Fig. 7
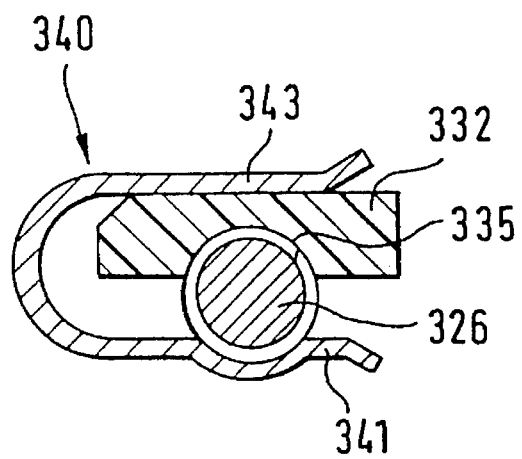

ARRANGEMENT WITH AT LEAST TWO STRUCTURAL PARTS ADJUSTABLY CONNECTABLE BY AN ADJUSTING SCREW

BACKGROUND OF THE INVENTION

The present invention relates to an arrangement with at least two structural parts adjustably connectable with one another by an adjusting screw.

Arrangement of the above mentioned general type are known in the art. One of such arrangements is disclosed for example in the German document DE 35 33 118 A1. This arrangement is formed as an illuminating arrangement and has a structural part formed as a housing, in which a further structural part formed as a reflector is turnably arranged. The adjusting screw is axially fixed to the housing and arranged in a rotatable fashion. A supporting part is mounted on the reflector and has an inner thread cooperating with the adjusting screw. The supporting part is composed of two halves separated from one another in a plane containing the longitudinal axis of the adjusting screw. In each half of the supporting part the inner thread is formed in a concave depression. The supporting part is composed of synthetic plastic material and its both halves are connected through a film hinge. During mounting of the adjusting screw both halves of the supporting part are not yet assembled, so that the adjusting screw can move axially relative to the supporting part and therefore can be brought fast substantially in the position which is required for the correct orientation of another structural part in form of the reflector. In this position both halves of the supporting part are assembled and radially connected with one another by an arresting connection, so that the inner thread of both halves cooperate with the outer thread of the adjusting screw. This arrangement has the disadvantage in that, the both halves of the supporting part must be brought together very accurately since otherwise both inner threads are not located in the same position and cannot correctly cooperate with the adjusting screw. As a result, the inner thread can be damaged and the supporting part can become non-useable. When the reflector is not easily accessible or blocked, the inner thread of the supporting part can be damaged when the adjusting screw in this case is not turned. Also, the manufacture of the supporting part due to the thin film hinge is critical. This arrangement therefore requires improvements with respect to their operational safety and the manufacture.

SUMMARY OF THE INVENTION

Accordingly, it is an object of the present invention to provide an arrangement with at least two structural parts which are adjustable relative to one another by an adjusting screw, which avoids the disadvantages of the prior art.

In keeping with these objects and with others which will become apparent hereinafter, one feature of the present invention resides, briefly stated, in the arrangement of the above mentioned general type, in which on another structural part or on a structural part connected with it an open threaded shell is formed, and on another structural part or on the part connected with it a U-shaped elastic holding element is releasably mounted and engages with a leg on a portion of another structural part or a structural part connected with it, and with its another leg engages the adjusting screw and holds it with a part of its periphery under prestress in abutment in the threaded shell.

When the arrangement is designed in accordance with the present invention, it has the advantage that the threaded shell is formed on a structural part while the holding element which holds the adjusting screw in abutment against the threaded shell does not need any thread. It is therefore guaranteed that the adjusting screw always correctly cooperates with the inner thread. When the structural part associated with a thread is difficult to access or blocked, then by a rotation of the adjusting screw the holding element is somewhat spring biased so that the outer thread of the adjusting screw is no longer in engagement with the inner thread of the threaded shell and the inner thread is not damaged. The U-shaped holding element can be produced in a simple manner.

In accordance with another feature of the present invention the leg which engages the adjusting screw has a depression which extends parallel to the adjusting screw so that the adjusting screw abuts against it with a part of its periphery. In this construction it is guaranteed that between the holding element and the adjusting screw a flat contact is formed and thereby a damage of the thread is avoided.

In accordance with still a further feature of the present invention a wall of another part or a part connected with it is arranged before the threaded shell as considered in a mounting direction of the adjusting screw and is provided with an opening through which the adjusting screw extends with radial play. With these features the mounting of the adjusting screw and the holding element is facilitated, since the adjusting screw is guided in the opening and therefore is located in the region of threaded shell.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 6 is a view a variant of the arrangement of FIG. 2; and

FIG. 7 is a view showing a further variant of the arrangement, in a section taken along the line III—III in FIG. 2.

DESCRIPTION OF THE PREFERRED EMBODIMENTS

Figure 1:
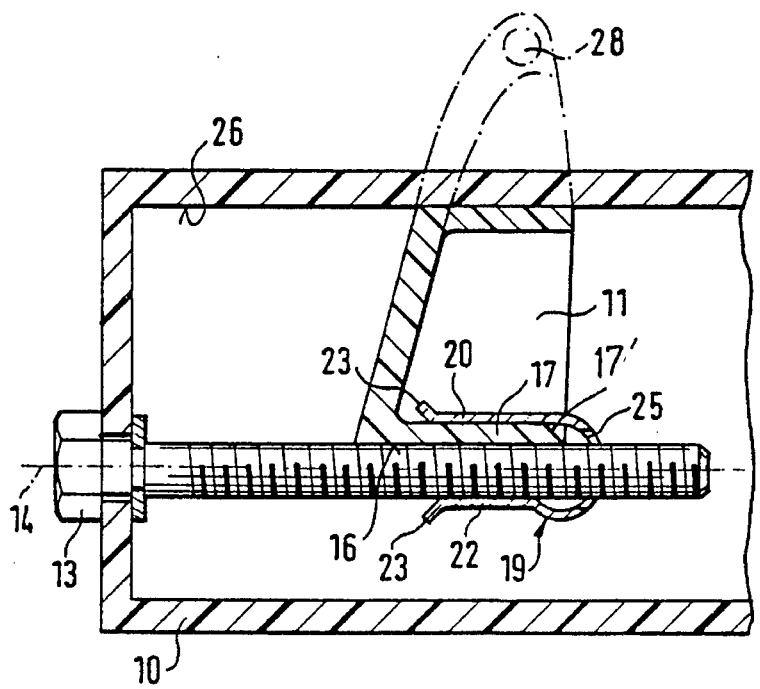
FIG. 1 is a view showing an arrangement in accordance with a first embodiment of the invention.

An arrangement shown in FIG. 1 has a first structural part 10 and a second structural part 11. Their relative distance is adjustable by an adjusting screw 13. The adjusting screw 13 is rotatably supported in the first structural part 10, and at the same time is axially fixed or in other words fixed along its longitudinal axis 14. An open threaded shell 16 is provided on the second structural part 11 and has a part or substantially half of the periphery provided with an inner thread. At least the region of the second structural part 11 which has the threaded shell 16 is composed of synthetic plastic material or metal, for example aluminum or zinc, and can be formed as a cast part. The second structural part 11 has a flattened portion 17 at the side which is opposite to the threaded shell 16. The arrangement further has a holding element 19 which is U-shaped and has one leg 20 engaging with the portion 17 of the second structural part 11 and another leg 22 engages with the shaft of the adjusting screw 13. The holding element 19 is composed of an elastic material, preferably spring steel, and its legs 20 and 22 are elastically expanded on the second structural part 11 in mounted condition. Due to the leg 22, the shaft of the adjusting screw 13 is held in the abutment in the threaded shell 16, so that the adjusting screw 13 cooperates with the thread of the threaded shell 16.

The legs 20 and 22 of the holding element extend substantially parallel to the longitudinal axis 14 of the adjusting screw 13 and their free ends 23 face toward the first structural part 10. In the apex region of the holding element 19 which faces away of the first structural part 10, an opening 25 is provided for the passage of the adjusting screw 13. The free ends 23 of the legs 20 and 22 are bent radially outwardly with respect to the adjusting screw 13. The portion 17 has an end region facing away of the first structural part 10 and having an end face 17' which is inclined so that together with the outwardly bent ends of the legs 20 and 22 a simple mounting of the holding element 19 is possible. The second structural part 11 can be arranged displaceably in a guide 26 or as shown in a broken line in FIG. 1 can be turnably supported on a bearing point 28. During a rotation of the adjusting screw 13 the second structural part 11 is moved relative to the first structural part 10 so that their axial distance relative to one another can be changed.

During mounting of the arrangement, first the adjusting screw 13 is mounted on the first structural part 10 and the second structural part 11 is brought relative to the first structural part 10 in the position desired for it. The holding element 19 is not yet mounted, so that the second structural part 11 can be moved independently on the adjusting screw 13. In this position of the second structural part the holding element 19 with its legs 20 and 22 extending toward the first structural part 10 is displaced on the adjusting screw 13 from its end which is opposite to the fixed end in the first structural part 10. During sliding on the portion 17 of the second structural part 11 both legs 20 and 22 are elastically bent, so that the adjusting screw 13 is held in the abutment in the threaded shell 16. Then an adjustment of the second structural part 11 is possible only by a turning of the adjusting screw 13. In case of difficult access or blocking of the second structural part 11 and a turning of the adjusting screw 13, a radial force acting on the adjusting screw 13 from the threaded shell 16 is provided. Therefore both legs 20 and 22 are elastically bent and the adjusting screw 13 can exit the threaded shell 16 so that its thread is no longer completely in engagement with the threaded shell 16 and therefore a damage of the thread is prevented or at least reduced.

Figure 2:
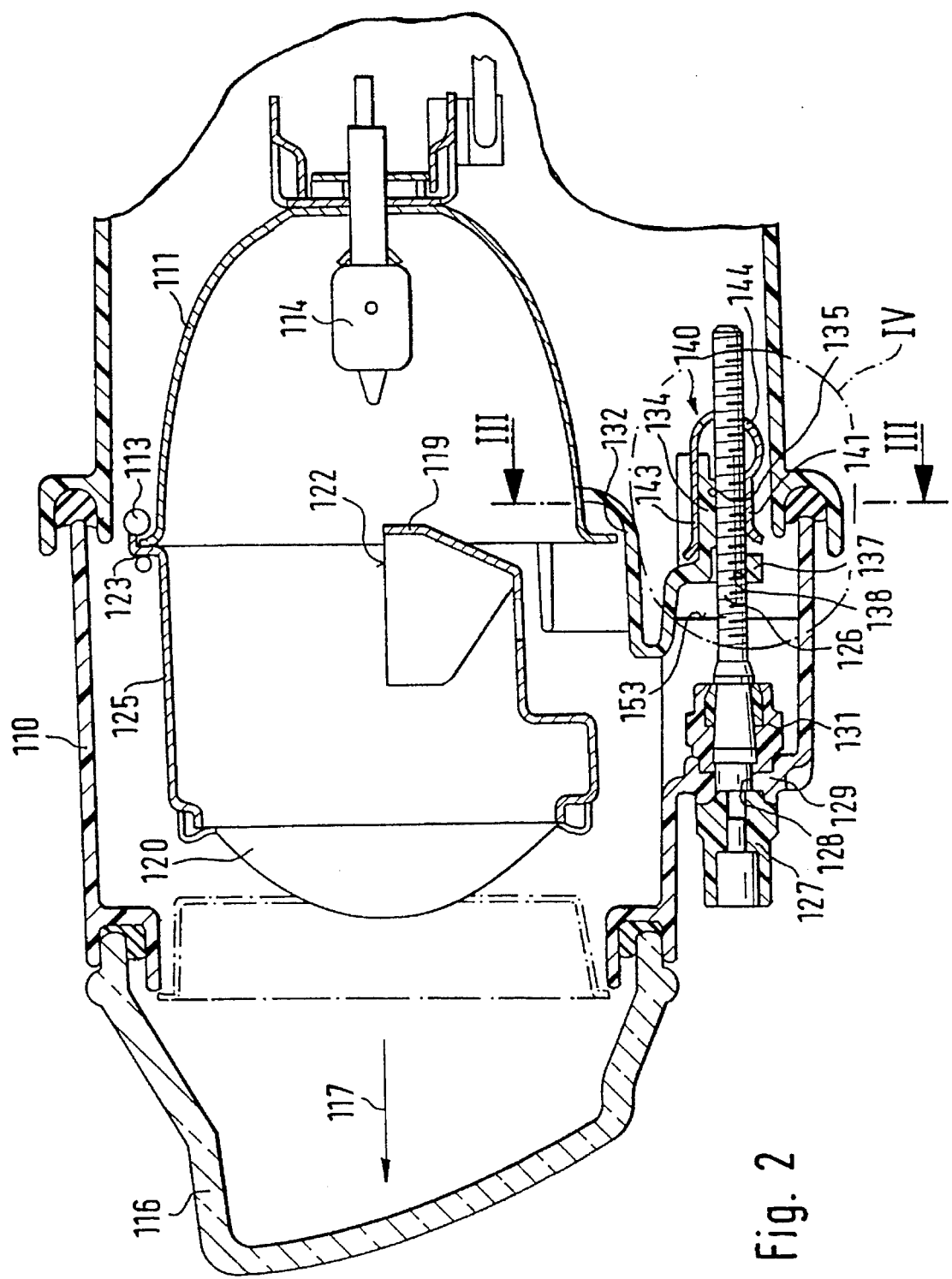
FIG. 2 is a view showing an arrangement in accordance with a second embodiment of the invention, formed as an illuminating arrangement.

In FIG. 2 a second embodiment of the inventive arrangement is shown and formed concretely as an illuminating arrangement, for example in form of a headlight. The headlight has a holder 110 representing a first structural part and forming a housing. It is composed of synthetic plastic material or another suitable material. A second structural part formed as a reflector 111 is arranged inside the housing 110 turnably relative to it at least about a horizontal axis 113.

A light source 114 is inserted in the reflector 111. The housing 110 has an opening in its front side and a light disc 116 covers the opening. The light disc is provided with optical elements for influencing the light reflected by the reflector 111. On the other hand, it can also be formed as a clear disc. A shutter 119 is arranged at a distance from the reflector 111 as considered in the light direction 117. A lens 120 is spaced from it also in the light direction and operates so that the upper edge 122 of the shutter 119 is formed as a bright/dark limit in the light distribution produced by the headlight. The shutter 119 is formed on a support 125 which is mounted on a front edge 123 of the reflector 111. It simultaneously forms a holder for the lens 120.

The adjusting screw 126 extends substantially parallel to the light direction 117 and its head 127 which faces in the light direction 117 extends outwardly of the housing 110 through an opening 128 in a housing wall 129. The head 127 abuts against the outer side of the housing wall 129. The adjusting screw 126 is axially fixed and at the same time is rotatable by means of an elastic part 131 which is displaced from the inner side on it and abuts against the inner side of the housing wall 129. A supporting part 132 composed of synthetic plastic material or metal is connected with the supporting part 132. In a lower region of the supporting part 132 it has a portion 134 which extends substantially parallel to the adjusting screw 126 and has an open threaded shell 135 which faces radially away from the reflector 111. The horizontal axis 113 about which the reflector 111 is turnable is arranged in its upper region. Alternatively, the supporting part 132 can be formed also of one piece with the reflector 111 which is composed of synthetic plastic material or metal. The threaded shell 135 has a substantially semicircular cross-section and is provided with an inner thread. The inner thread extends for example over an angle of approximately 90° inside the threaded shell 135. A wall 137 which is provided with an opening 138 extends substantially perpendicularly to the adjusting screw 126 in the end region of the portion 134 of the supporting part 132 which faces in the light direction 117. The wall 137 is provided an opening 138 which has a cross-section substantially greater than the adjusting screw 126 and is arranged so that the adjusting screw 126 after passing through the opening 138 is located in the region of the threaded shell 135. The end region of the opening 138 which faces in the light direction 117 expands conically, so that the adjusting screw 126 can be easily inserted in the opening 138.

The U-shaped holding element 140 is fitted on the adjusting screw 126 from the inner side of the housing 110 and extends with its legs 141 and 143 in the light direction 117. The holding element 140 is composed of an elastic material, preferably spring steel. The lower leg 141 of the holding element 140 engages with the adjusting screw 126, while the upper leg 133 engages with the side of the portion 134 of the supporting part 132 which faces away of the threaded shell 135. The lower leg 141 has a smooth surface without a thread, facing the adjusting screw 126. The legs 141 and 143 of the holding element 140 are elastically spread from one another in a mounted condition, so that the adjusting screw 126 is held in abutment in the threaded shell 135. The end regions of the legs 141 and 143 are radially outwardly bent relative to the adjusting screw 126. Moreover, the end region of the supporting part 132 which faces opposite to the light direction 117 has a face 132' which is inclined to the adjusting screw 126, so as to provide together with the outwardly bent ends of the legs 141 and 143 a simple mounting of the holding element 140. The apex region of the holding element 140 which faces opposite to the light direction 117 is provided with an opening 144 for passing the adjusting screw 126.

Figure 3:
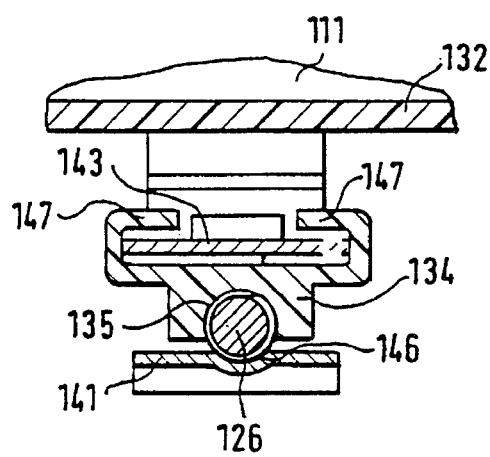
FIG. 3 is a view showing a section taken along the line III—III in FIG. 2.

The lower leg 141 of the holding element 140 which engages with the adjusting screw 126 has a concave depression 146 as shown in FIG. 3. The depression extends parallel to the adjusting screw 126 and abuts in it with a part of its periphery. Thereby it is guaranteed that between the leg 141 and the adjusting screw 126 a linear abutment is produced and therefore a damage of the thread of the adjusting screw 126 is avoided due to high surface pressure.

FIG. 3 also shows a guide of the upper leg 143 of the holding element 140, which engages the portion 134. The guide is formed by two strips 147 extending parallel to the adjusting screw 126 and arranged at both sides of the leg 143. They form an L-shaped cross-section and engage the leg 143 at both sides of its edge. The radial outwardly bent end region of the leg 143 is as wide as the region remaining between the strips 147.

Figure 4:
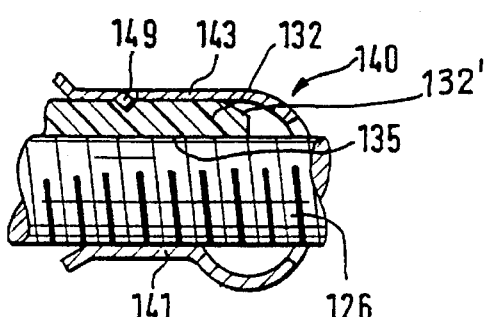
FIG. 4 is a view showing a portion IV of the arrangement of FIG. 2 on an enlarged scale.
Figure 5:
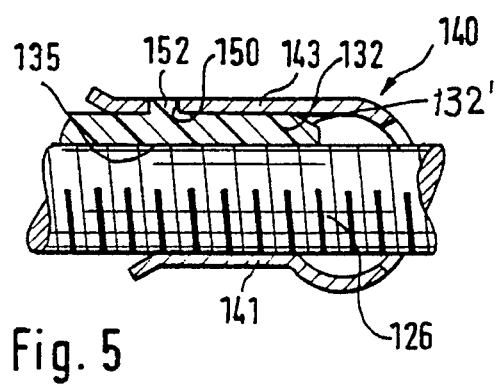
FIG. 5 is a view showing a portion IV in accordance with a further variant of the invention.

The holding element 140 is secured preferably against a movement opposite to its mounting direction or in other words in the light direction 117. Otherwise, in condition of high forces acting against the light direction 117 it can be released and thereby the connection of the supporting part 132 with the adjusting screw 126 can be lost. A securing of the holding element 140 is performed through its upper leg 143 which, as shown in FIG. 4 has a hook 149 which projects from it and extends to its abutment surface on the supporting part 132. A free end of the hook 149 faces opposite to the mounting direction 117 of the holding element 140. The hook 149 engages in the supporting part 132 which is composed of synthetic plastic material and prevents a movement of the holding element 140 against its mounting direction 117. In the variant shown in FIG. 5, the securing of the holding element 140 is performed by an arresting device. The leg 143 has a recess 150 and the portion 134 of the supporting part 132 is provided with a projection 152 facing the leg 143. In the end position of the holding element 140 the projection engages in the recess 150 and secures the position of the holding element 140. In a not shown variant, the projection 152 can be also arranged on the leg 143 of the holding element 140 and the recess 150 can be arranged in the portion 134 of the supporting part 132. Therefore, a reliable position of the holding element 140 is obtained in the same manner.

During mounting of the adjusting screw 126 it is first fixed on the housing 110 by means of the elastic part 131 which is displaced from the inner side of the housing 110. Then the reflector 111 together with the supporting part 132 are displaced in the light direction 117 into the housing 110 from a rear side, and the adjusting screw 126 is guided through the opening 138 in the wall 137 of the supporting part 132. The adjusting screw 126 extends with the radial gap through the opening 138, so that it is not yet in the engagement with the threaded shell 135. The relative position between the adjusting screw 126 and the supporting part 132 is approximately adjusted in the required manner. In this position the holding element 140 is mounted and thereby the connection of the adjusting screw 126 with the threaded shell 135 is produced. For a further accurate adjustment of the reflector 111, the adjusting screw 126 is turned and thereby the supporting part 132 is moved, so that the reflector 111 is turned about its axis 113.

An abutment 153 is provided in the housing 110 for limiting the movement of the reflector 111. The supporting part 132 in an end position of the reflector 111 comes to abutment against the abutment 153. When the supporting part 132 abuts against the abutment 153 and the adjusting screw 126 is further turned, the radial force provided by the thread acts on the adjusting screw 126. Thereby the adjusting screw 126 is moved from the threaded shell 135 and both legs 141 and 143 of the holding element 140 are elastically bent and the adjusting screw 126 can somewhat exit from the threaded shell 135. Therefore its thread is no longer in full engagement with the threaded shell 135 and a damage of the thread is prevented or at least reduced.

In a variant of the illuminating device shown in FIG. 6 the adjusting screw 226 is rotatable and axially fixed in its end region 253 arranged in the housing 210, with the reflector 211 or with the supporting part 232 connected with it. The connection between the adjusting screw 226 and the reflector 211 or the supporting part 232 can be performed for example by a spherical hinge 255. The housing wall 229 has an opening 228. An inwardly facing portion 234 projects at its edge from the housing wall 229 and has the threaded shell 235 which is formed as in the second embodiment shown in FIG. 2. The head 227 of the adjusting screw 226 extends outwardly of the housing 210 for its actuation. A holding element 240 is fitted on the portion 234 as in the second embodiment. In this embodiment the adjusting screw 226 axially moves during its turning together with the supporting part 232.

FIG. 7 shows a further variant of the illumination device of FIG. 2. Here, the U-shaped holding element 340 is arranged with its legs 341 and 343 transversely to the adjusting screw 326. The holding element 340 as well as the supporting part 332 with the threaded shell 335 can be formed as in the preceding embodiments or variants.

While the invention has been illustrated and described as embodied in an arrangement with at least two structural parts adjustable relative to one another by an adjusting screw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An adjustable composite device, comprising at least two parts; an adjusting screw adjusting the positions of said parts relative to one another, said adjusting screw being axially fixed with one of said structural parts so as to be rotatable relative to said one structural part and threadingly connectable with another of said structural parts; an open shell provided with an internal thread and formed on said another structural part; and a U-shaped elastic holding element movable onto said another structural part in a mounting direction along a longitudinal direction of said adjusting screw so as to be releasably mounted on said another structural part and having one leg engaging a portion of said another structural part and another leg engaging said adjusting screw so as to hold said adjusting screw with a part of its periphery under tensioning in abutment in said threaded shell.

2. An arrangement as defined in claim 1, wherein said another structural part is composed of synthetic plastic material.

3. An arrangement as defined in claim 1, wherein said holding element is composed of metal.

4. An arrangement as defined in claim 1, wherein said holding element is secured on said portion against movement opposite to said mounting direction.

5. An arrangement as defined in claim 1, wherein said another structural part has a wall facing said legs and located in front of said threaded shell, said wall being provided with an opening through which said adjusting screw extends with a radial gap.

6. An arrangement as defined in claim 1, wherein said one structural part is formed as a holder of an illuminating device, while said another structural part is formed as a reflector of the illuminating device.

7. An arrangement as defined in claim 6, wherein said holder is formed as a housing in which said reflector is adjustably arranged, said adjusting screw having an end region extending outside of said housing to be actuated.

8. An arrangement as defined in claim 6, wherein said adjusting screw is axially fixedly and turnably connected with said holder, said reflector being provided with said threaded shell.

9. An adjustable composite device, comprising at least two parts; an adjusting screw adjusting the positions of said parts relative to one another, said adjusting screw being axially fixed with one of said structural parts so as to be rotatable relative to said one structural part and threadingly connectable with another of said structural parts; an open shell which is provided with an internal thread and is formed on said another structural part; and a U-shaped elastic holding element releasably mounted on said another structural part and having one leg engaging a portion of said another structural part and another leg engaging said adjusting screw so as to hold said adjusting screw with a part of its periphery under tensioning in abutment in said threaded shell, said legs extending substantially in a longitudinal direction of said adjusting screw, said holding element having an apex region provided with an opening for passing said adjusting screw.

10. An arrangement as defined in claim 9; and further comprising means for securing said holding element against movement opposite to its mounting direction, said securing means including a sharp edged projection provided on said holding element and engaging in said portion.

11. An adjustable composite device, comprising at least two parts; an adjusting screw adjusting the positions of said parts relative to one another, said adjusting screw being axially fixed with one of said structural parts so as to be rotatable relative to said one structural part and threadingly connectable with another of said structural parts; an open shell which is provided with an internal thread and is formed on said another structural part; a U-shaped elastic holding element releasably mounted on said another structural part, by moving onto said another structural part in a mounting direction, and having one leg engaging a portion of said another structural part and another leg engaging said adjusting screw so as to hold said adjusting screw with a part of its periphery under tensioning in abutment in said threaded shell, said holding element being secured on said portion against movement opposite to said mounting direction; and means for securing said holding element against movement opposite to its mounting direction, said securing means including an arresting connection between said holding element and said portion.

12. An adjustable composite device, comprising at least two parts; an adjusting screw adjusting the positions of said parts relative to one another, said adjusting screw being axially fixed with one of said structural parts so as to be rotatable relative to said one structural part and threadingly connectable with another of said structural parts; an open shell which is provided with an internal thread and is formed on said another structural part; and a U-shaped elastic holding element releasably mounted on said another structural part, by moving onto said another structural part in a mounting direction, and having one leg engaging a portion of said another structural part and another leg engaging said adjusting screw so as to hold said adjusting screw with a part of its periphery under tensioning in abutment An said threaded shell; and a guide provided for said holding element and arranged on said portion so as to guide said holding element along said mounting direction.

13. An adjustable composite device, comprising at least two parts; an adjusting screw adjusting the positions of said parts relative to one another, said adjusting screw being axially fixed with one of said structural parts so as to be rotatable relative to said one structural part and threadingly connectable with another of said structural parts; an open shell which is provided with an internal thread and is formed on said another structural part; and a U-shaped elastic holding element releasably mounted on said another structural part, by moving onto said another structural part in a mounting direction, and having one leg engaging a portion of said another structural part and another leg engaging said adjusting screw so as to hold said adjusting screw with a part of its periphery under tensioning in abutment in said threaded shell, said another leg which engages an adjusting screw having a concave depression extending parallel to said adjusting screw, said adjusting screw abutting with a part of its periphery against said depression.

* * * * *